Feb. 10, 1970 E. E. CLIFT 3,495,038

CRYPTOGRAPHIC SYSTEM

Filed March 21, 1968 2 Sheets-Sheet 1

INVENTOR
EUGENE EMERSON CLIFT
BY
Fenwick & Lawrence, Mason,
ATTORNEYS

United States Patent Office 3,495,038

Patented Feb. 10, 1970

3,495,038

CRYPTOGRAPHIC SYSTEM

Eugene Emerson Clift, 437½ N. Oleander, Daytona Beach, Fla. 32014

Continuation-in-part of application Ser. No. 576,053, Aug. 30, 1966. This application Mar. 21, 1968, Ser. No. 715,130

Int. Cl. H04l 9/04

U.S. Cl. 178—22

8 Claims

ABSTRACT OF THE DISCLOSURE

A cryptographic system including encoding apparatus for enciphering plaintext characters including print command symbols into ciphers in the form of transmitted tone signals of selected distinct frequencies, and decoding apparatus for deciphering such tone signals into correct text, wherein cipher translating matrix means for translation between ciphers and plaintext characters in each of the encoding and decoding apparatus each have a selected change sequence and are reset at random intervals to cycle through the sequence in coordinated relation.

This application is a continuation-in-part of my earlier copending application Ser. No. 576,053, filed Aug. 30, 1966, now abandoned.

This invention relates to the field of cryptographic devices and more particularly to a cryptographic system designed to transmit and receive automatically non-coherent tone messages and provide a deciphered printout. Any known method of electronic communication may be used for the tone transmission, including radio, telephone lines, microwaves and lasers.

Although it has natural applications in the cryptographic services of the military and various government departments, an important object of this invention is that it also can be used by business and industry as a means for private communication that is designed to defy unauthorized deciphering. The importance of the commercial application of a positive system that will guarantee privacy of communication should be fully apparent in this electronic age that is filled with elaborate wire tapping and other sophisticated eavesdropping devices.

By the present invention the ciphers generated by the encoding means are in the form of tone patterns whose relationship to the plaintext characters varies in a random fashion. This tone pattern is automatically generated by the encoding means and automatically received and a printout obtained by the decoding means of this system.

A means is provided to maintain synchronization between the encoder-transmitter unit and all decoder-receiver units so that the decoder units translate the ciphers to text in proper correlation to the translations from plaintext to ciphers being performed by the encoder unit notwithstanding the random change in cipher pattern of the system. A cipher change occurs after every letter, number, character, graphic symbol or print command symbol, all hereinafter collectively referred to as characters, by operating a cipher translation matrix through a change sequence, and this sequence is reset at random intervals, for example responsive to transmitting a "period," to maintain the change sequences of the encoder and decoder in synchronization.

An important advantage of this invention is that no key or key tape is required to obtain a deciphered printout.

A further object of this invention is to provide the essential element of secrecy in the operation of the system and provide a high degree of flexibility for making periodic system changes. This is obtained by the employment of two programmer devices in all encoding units and two similar programmers in all decoding units for setting up the cipher generation pattern. The encoding pair can be programmed for any cipher generation pattern, but whatever pattern is used must be duplicated in the programmers in all receiver units in the system.

DESCRIPTION OF A PREFERRED EMBODIMENT

Figure 1:
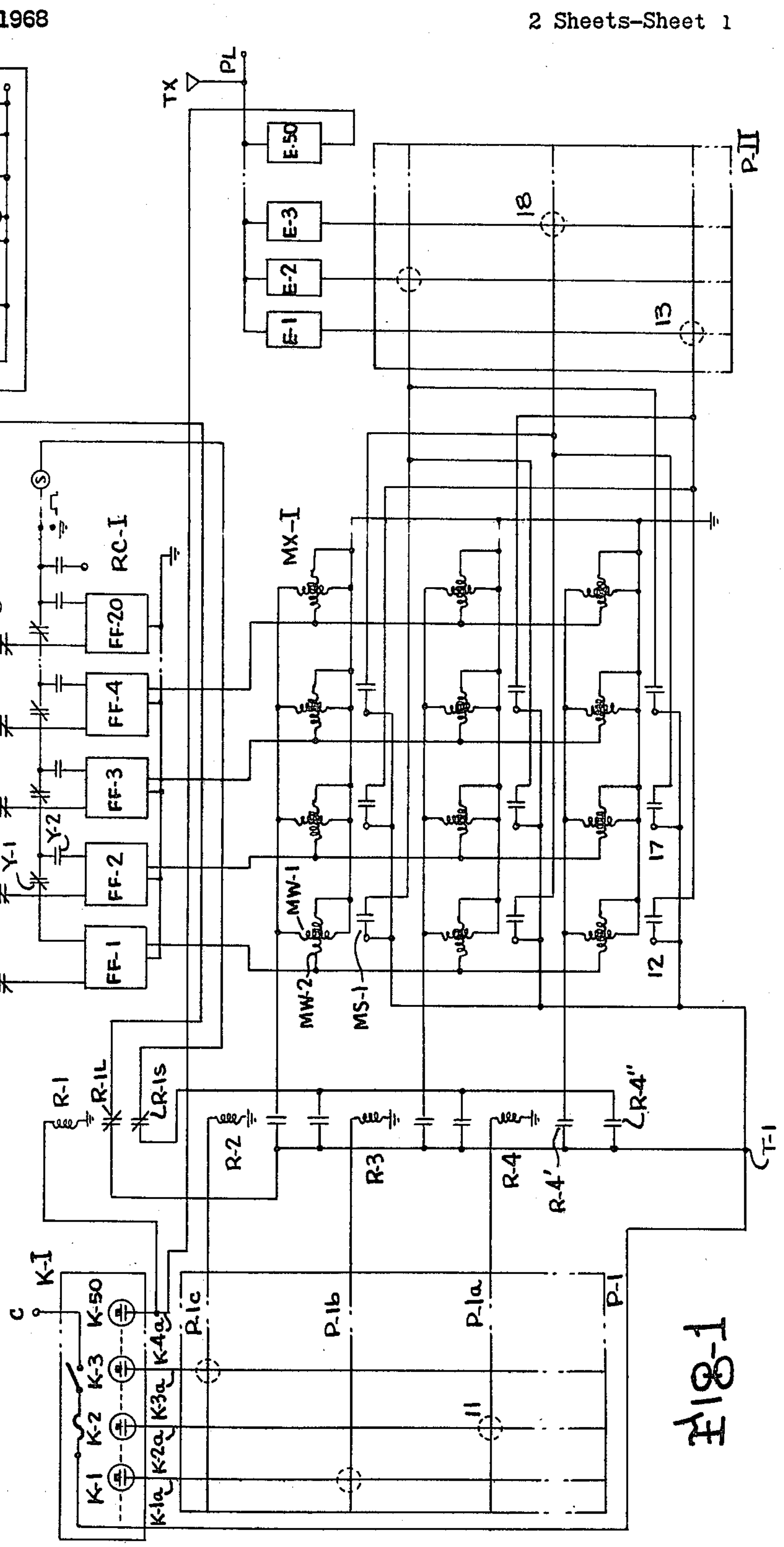
FIGURE 1 is a schematic representation of encoding apparatus embodying the present invention.

Referring to FIGURE 1, representing schematically the encoding apparatus of the present invention, the encoder unit includes a commercially available encoder keyboard K–I, having for example 50 manually operated contacts, as indicated at K–1, K–2, K–3 and K–50. A standard electric typewriter or a commercially available keyboard encoder may be used for this purpose to provide an appropriate voltage on the output leads K–1*a* to K–50*a* thereof to activate the coils of reed relays R–1 to R–4, to be later described, when the associated contacts are closed. It is also possible to use similar circuits of the Teletype printer, which would permit the use of punched tapes for high speed encoding.

The two programmers used in the encoding phase are identified by reference characters P–I and P–II. These may be of the slide switch type in which a series of slide switches, each for example connected to a respective input terminal coupled to a distinctive one of the output leads K–1*a*, K–2*a*, etc., are manually moved along a bus bar to a selected crosspoint, to complete a circuit at the selected crosspoint between its associate input terminal and one of the output leads P–I*a*, P–I*b*, P–Ic.

The encoding apparatus also includes a cipher translation matrix unit, formed for example of a commercially available single mode matrix, identified as MX–I, and composed of a series of cross-point modules on printed circuit boards. Each crosspoint module contains a double wound driving coil having two windings MW–1 and MW–2 and one reed switch MS–1. Coincident current in the two windings MW–1 and MW–2 of a coil will close the associated reed switch MS–1 at the crosspoint. The reed switches MS–1 are connected at the left hand side of the matrix to a D.C. voltage source, for example at the terminal labeled T–I, which may connect through the keyboard unit K–I and a master ON–OFF switch S–1 therein to the D.C. supply.

The horizontal axis circuits, formed by windings MW–1, of the matrix are driven by the primed contacts of individual reed relays, equal to the number of horizontal axis circuits of matrix MX–I plus 1, these relays being indicated schematically in the drawing at R–2, R–3 and R–4. The coils of these relays R–2, R–3, R–4 are coupled to the programmer output leads P–I*a*, P–I*b*, P–Ic, and thus are connected to the contacts K–1, K–2, K–3, etc., of the encoder keyboard in accordance with the particular setting of the programmer P–I. The vertical axis circuits of the matrix MX–I, formed by windings MW–2, are driven by a commercially available ring counter, RC–I, composed of hybrid flip-flops on a printed circuit board. In the exemplary embodiment, twenty of such ring counter flop-flops are employed, indicated in the drawings as FF–1, FF–2, FF–3, FF–4 and FF–20. Each flip-flop is operated and released in sequence, to progress the application of current from a suitable D.C. source, such as terminal T–1, from one vertical column of windings MW–2 to the next. As will be later explained in greater detail, the first pulse from the keyboard K–I is steered to the SET input S of the first flop-flop FF–1, and an output for the first column of vertical axis circuits of the matrix is obtained from the X contacts shown in FIGURE 2. When the first keyboard pulse terminates, Y coils of the flip-flop operate, opening relay contacts (such as contacts Y–1 in FIGURE 1) in the SET pulse circuit to the first flip-flop and closing the contacts (such as contacts Y–2) of the SET pulse circuit to the second flip-flop. The stage ahead breaks the LATCH (L) power line and drops the stage which has been energized, with both the X and Y coils of the flip-flop being de-energized at this time.

It should be pointed out that when the last module is reached, the next SET pulse is steered back to the first flip-flop in the ring. The ring also may be reset by a momentary interruption of the LATCH supply voltage. This is achieved in this system at random intervals by relay R–1, activated by K–50, as later described.

Figure 3:
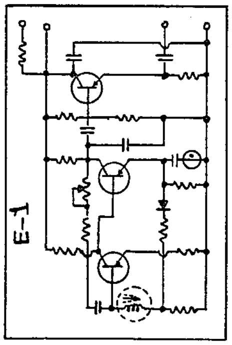
FIGURE 3 is a schematic diagram of a tone encoder employed in the encoder of the invention.

Also included in the encoding apparatus of this invention are a plurality of resonant reed encoders, corresponding in number to the number of keyboard contacts and here indicated in the drawing as E–1, E–2, E–3 and E–50. A detail of a commercially available encoder usable for each of the encoders E–1, E–2, etc., is shown in FIGURE 3. The encoder circuit of FIGURE 3 includes an amplifier, a feedback circuit, and a frequency control circuit. Each resonant reed encoder operates on a narrow band-width in a selected frequency with no overlapping in the spectrum used. Each encoder module thus can generate its own audio tone for transmission by either phone lines, as indicated at PL, or radio, as indicated at TX, or both, or any other known means, for the purpose of performing a control function, and all but encoder E–50 are connected to the programmer P–II to be operated responsive to selected outputs from the cipher translation matrix MX–I.

Figures 4, 5:
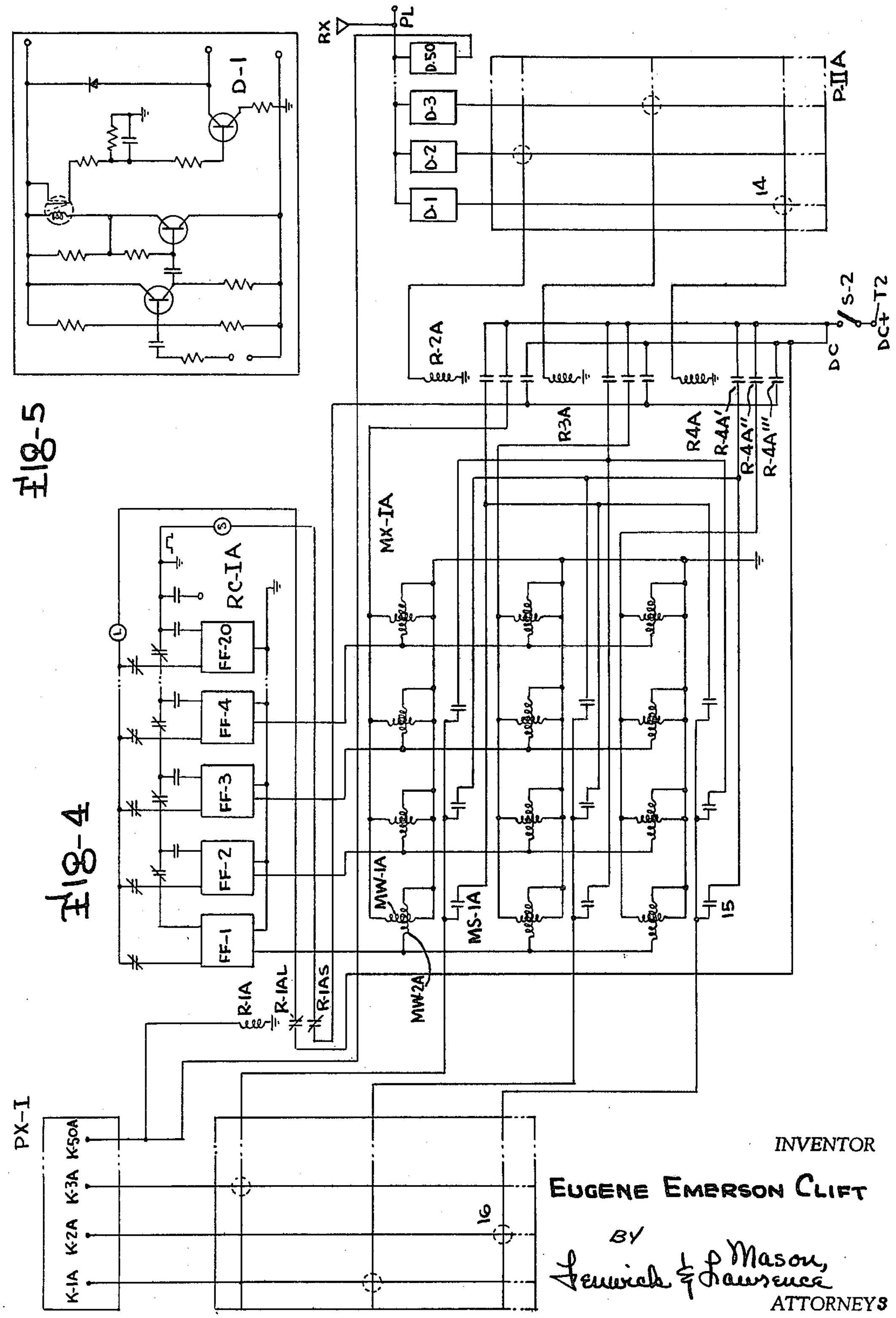
FIGURE 4 is a schematic representation of decoding apparatus embodying the present invention.
FIGURE 5 is a schematic diagram of a tone decoder employed in the decoding apparatus of the present invention.

FIGURE 4 is a wiring diagram of the decoding apparatus which is similar in many respects to the circuits of the encoding system of FIGURE 1. Obviously the signal flow is reversed in FIGURE 4 relative to FIGURE 1, so that this phase of the system ends with the desired decoded printout.

As diagrammed, the tone signals are received either by wire PL′ or by radio at RX, and channeled to a plurality of commercially available decoders corresponding in number to encoders E–1 to E–50 and indicated as D–1, D–2, D–3 and D–50, with the properly mated decoder responding only to the tone signal sent by its matched encoder module. A detail of the decoder module used in the invention is shown in FIGURE 5. When the proper predetermined frequency is received, the reed of the decoder D–1 to D–50 vibrates, causing intermittent contact closure which is integrated with a resistor and capacitor and causes the transistor in the circuit to conduct, providing a constant D.C. voltage output across the external load. The front end of the decoder is a two stage amplifier having a high impedance input.

The programmers, P–IA and P–IIA, employed in the decoding apparatus are the same as previously described in the encoder apparatus as shown in FIGURE 1. The single mode matrix MX–IA and its associated ring-counter RC–IA also are identical to the previously described units in the encoder apparatus. The reed relays R–1A, R–2A, R–3A and R–4A also are similar to their counterparts in the encoder apparatus, but in the case of the decoding apparatus have three contacts each, instead of two, and are interposed between programmer P–IIA and the matrix MX–IA. Contacts R2–2A′ to R–4A′ apply D.C. voltage from the terminal T–2 and master ON-OFF switch S–2 to one side of the reed switches MS–1A of the matrix crosspoint modules, contacts R–2A″ to R–4A″ apply this voltage to the horizontal axis windings MW–1A, and contacts R–2A‴ to R–4A‴ apply this voltage to the SET input S of the flip-flops.

Included in the decoding apparatus is the printer PX–I. This can be a printer without a keyboard, or it may be an electric typewriter or Teletype sender-receiver adapted to receive print command pulses from the relays in the decoder system of this invention.

Figure 2:
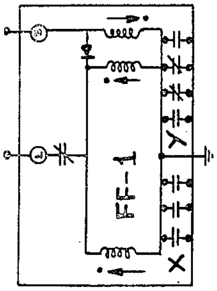
FIGURE 2 is a schematic diagram of a flip-flop device employed in the encoder of the present invention.

It should be pointed out that only three of the encoding and decoding circuits through the programmers are completed in FIGURE 1 and FIGURE 2 to simplify the explanation of this invention. However, with the exception of the circuit associated with keyboard contact K–50, which includes connections to the coil of R–1, or the circuit associated with printout element K–50A, which includes connections to the coil of R1A, the remaining keyboard contacts and encoders of the encoding apparatus and the remaining decoders and printout elements are interconnected through their associated programmers and cipher translation matrix in a manner similar to the circuits illustrated in FIGURES 1 and 4. It also should be pointed out that for diagram simplicity, only five flip-flops are shown in the ring counter circuits RC–I and RC–IA, although twenty flip-flops are indicated for both encoder and decoder circuits in the system.

For a more complete understanding of the invention, broken line circles have been indicated at certain crosspoints of the programmers P–I, P–II, P–IA and P–IIA, to indicate a particular group of programmer settings. The setting of programmer P–I determines which relay coil, P–2, R–3 and R–4, will be energized by the pulses produced by depressing particular keys of the encoding keyboard K–I. Only one vertical setting on any horizontal crosspoint is permitted in the programming.

Assume that a pulse has been applied to output lead K–2*a* by depressing the contact K–2, which could represent any letter, number, character or print command, depending on the wiring of the keyboard circuit (the printer or printers used in the system being wired in an identical manner), and for the purpose of this explanation, assume that the K–2 contact represents the letter B. The setting on the K–2 bus bar of the programmer P–I, as indicated by the crosspoint circle 11, reveals that its crosspoint will connect with the horizontal output lead P–I*c* connecting to the coil of relay R–4. The contact R–4′ of R–4, therefore, sends a pulse through the third horizontal axis of the matrix MX–I to the windings MW–1 thereof and the second contact R–4″ of R–4 sends a pulse to the SET (S) circuit of the ring counter RC–I, after passing through a closed contact R–1*s* of R–1. Assuming that the ring counter is in its home or first position, this set pulse applied through contacts R–4″ and R–1*s* would pull in the X coil of flip-flop, FF–1, and a pulse would be sent from its X contact, through the first vertical axis circuit of the matrix MX–1 to the windings MW–2 of the first vertical column of coils. The coincident current in the two windings MW–1 and MW–2 of the coil at the matrix crosspoint 12 resulting from energizing R–4 and FF–1 will close the switch MS–1 at that crosspoint. It can be observed that the circuit from the above described matrix crosspoint 12 leads to the third row horizontal conductor of the programmer P–II, and to other open contacts in the matrix, with no two contacts having the same vertical crosspoint. In effect, each vertical axis of the matrix contains every letter, number, character or print command on the encoding keyboard and makes up a cipher controlled by a flip-flop in the ring counter. Cipher 1 is controlled by flip-flop FF–1; cipher 2 is controlled by flip-flop FF–2, and so on with the number of ciphers solely dependent on the number of flip-flops in the ring. No two ciphers are identical in the matrix operated in part by the twenty flip-flop ring indicated in this system.

It should be apparent then that since the flip-flops in the ring RC–I operate in sequence, no cipher is used twice in succession. As previously stated in the operation of the ring counter RC–I, when the keyboard pulse is terminated, the Y contacts of the flip-flop channel the next keyboard encoding pulse to the next higher flip-flop in the ring.

To prevent the possibility of a cipher pattern being established by the normal operating sequence of the flip-flops in the ring, relay R–1 is used at random to reset the ring. Assume that R–1 is pulled in by the encoding keyboard key K–50, and that K–50 for this illustration represents a "period." The use of the "period" key is a convenient means of producing random resetting of the ring RC–I, since the location of the "period" in a message is a random factor, depending on the length of a sentence, the location of an abbreviation, and other random uses in a message. Its use, therefore, could occur in any of the twenty flip-flop positions of the ring RC–I. This in effect would change the normal cycle of the ring RC–I, since the ring would be reset each time the keyboard "period" key K–50 was punched.

One closed contact R–1L of R–1 is used to interrupt the LATCH power circuit (L) to the ring counter RC–I, and the other closed contact R–1S of R–1 is used to interrupt the SET pulse circuit (S).

Attention is now directed to programmer P–II, which is identical to P–I, but the circuits from its vertical bus bars lead to the tone encoder modules E–1, E–2, E–3, but not to the encoder E–50. As previously stated, a circuit from the matrix MX–I to the third horizontal conductor of programmer P–II is established when the matrix crosspoint 12 is closed as the result of the activation of the K–2 contact of the keyboard encoder, and the action of the ring counter RC–I. As can be observed, programmer P–II is programmed so that the crosspoint 13 channels the pulse from matrix crosspoint 12 to the E–1 encoder module. As in programmer P–I, only one vertical setting on any horizontal crosspoint is desired in the programming. And of course, programmer P–1 should be programmed differently from programmer P–II, so as to compound the problems for any attempt at unauthorized deciphering. The E–1 encoder module, upon energization, generates a tone signal at a certain fixed number of cycles per second, which can be transmitted by wire or radio as indicated to one or more decoder-receivers.

Referring now to the decoder apparatus diagrammed in FIGURE 4, the tone signal generated by the E–1 encoder module is received by phone line wires PL′ or radio antenna and receiver RX and produces a response from its mated decoder module D–1, which energizes the first vertical circuit leading from D–1 to the programmer P–IIA. The circle 14 represents the crosspoint setting of the programmer P–IIA, which is the identical setting of P–II, and as a result the coil of relay R–4A is now energized. The contact R–4A′ of relay R–4A completes a circuit from the D.C. supply at terminal T–2 to selected contacts MS–1A of matrix MX–IA, resembling the connections between the contacts of matrix MX–I and programmer P–II. The second contact R–4*a*″ connects the D.C. supply from terminal T–2 to the third row of horizontal axis windings MW–1A, while the third contact R–4*a*‴ provides a circuit through the closed contact R–1AS to the SET pulse circuit (S) to the ring counter RC–IA.

Assuming, as in the description of the encoding circuit, that the ring counter RC–IA also is in its home or first position, the set pulse applied through contact R–4A‴ responsive to activation of decoder D–1 will energize the X coil of the flip-flop FF–I, and the open X contact will close, energizing the windings MW–2A of the first vertical circuit in the matrix MX–1A. As the horizontal axis windings MW–1A of the bottom row of the matrix MX–IA have been concurrently energized by contacts R–4A″, it follows that coincidence has been created at the third row crosspoint 15 of the matrix driven by the flip-flop FF–1. This closes the associated contact MS–1A at crosspoint 15, to which power is being sent by the contact R–4A′, providing an energized circuit to the circled crosspoint 16 in the programmer P–IA, which has a program setting identical to that of programmer P–I. The vertical bus bar from this setting leads directly to the K–2A contact of the printer PX–I, and results in the printout of the letter B, which is the same letter as the one encoded by the K–2 key of the keyboard K–I.

It also should be apparent that if a pulse were sent to the K–50A contact of the printer PX–1, relay R–1A would also be pulled in. The activation of relay R–IA results in resetting the ring counter RC–IA by interrupting the LATCH circuit (L) to the ring counter RC–IA, in an identical manner the encoding pulse from K–50 of the keyboard encoder K–I resets the ring counter RC–I of the encoding apparatus of FIGURE 1. Besides creating the random cipher pattern as previously explained, this reset action of K–50 and K–50A also will permit the decoder-receiver ring circuits to be re-synchronized at frequent intervals and for the start of each transmission, since all ring counters are automatically reset when the power to the LATCH circuit (L) of the ring counters is interrupted when the system is shut down at the close of each transmission. Each time a period occurs in the message being transmitted, the systems are thus automatically re-synchronized, and this may be achieved at even shorter intervals, if desired, by periodic actuation of the key K–50. This offsets the effect of power or signal failures that could result in some receivers getting out of time with the transmitting system.

It also should be apparent that if the ring counter RC–I was standing in the second position at the time of actuation of key K–2, a different cipher would be produced. For example: If the K–2 contact of K–I in FIGURE 1 had been engaged and the ring counter RC–1 was in the second position, the matrix coil would be controlled by flip-flop FF–2, and the third contact 17 in the second vertical row would have been closed. This would have set up a circuit through the programmer P–II at crosspoint 18 that would have energized the E–3 encoder. Thus, the D–3 decoder of the receiver unit would have set up the reverse of the encoding circuit and would have resulted in a K–2 contact printout by PX–I.

If the ring counters were in their third position, the encoder module would have been E–2 and the decoder module D–2, if K–2 remained as the keyboard pulse. A similar pattern can be observed in the other circuits diagrammed.

Instead of providing three contacts for each of the relays R–2A, R–3A and R–4A of the decoding apparatus, the contacts R–4A″ could be eliminated and the lead from contacts R–4A‴ to the SET circuit of the ring counter RC–IA could also be connected to all of the horizontal axis windings MW–1A of the matrix crosspoint modules. This, however, has the disadvantage of greater power consumption than the illustrated arrangement, as all horizontal axis windings are energized each time one of the relays R–2A, R–3A, R–4A closes, and the contacts MS–1A of all first column crosspoint modules controlled by flip-flop FF–1 must close (although power from contact R–2A′, R–3A′ or R–4A′ is applied to only one of the thus closed crosspoint contacts MS–1A).

What is claimed is:

1. A cryptographic system comprising encoding apparatus for enciphering characters into ciphers and transmitting signal representations thereof and decoding apparatus for responding to said signal representations and deciphering the ciphers represented thereby into correct text, a cipher translation matrix means in each of said encoding and decoding apparatus for translating character-denoting input signals into ciphers in said encoding apparatus and translating cipher-denoting input signals into decoded characters in the decoding apparatus, ring counter means coupled to each respective matrix means for cycling through a selected count modulus and advancing the associated matrix through a selected change sequence responsive to successive application of said input signals thereto, means for concurrently applying said input signals to said ring counter means and to selected sections of said matrix means, and means for resetting said ring counter means to a selected initial count condition responsive to selected said input signals to re-synchronize said encoding and decoding apparatus.

2. A cryptographic system as defined in claim 1, wherein said matrix comprises a plurality of first axis circuits and second axis circuits defining plural crosspoints, normally open crosspoint contacts at each of said crosspoints, each having associated first and second windings for closing the associated crosspoint contact upon concurrent energization of said windings, said first windings being connected in plural sets of first axis circuits for application of said input signals thereto, and said second windings being connected in plural sets of second axis circuits and intercoupled with said ring counter means to energize said sets of second windings in a selected progressive sequence commencing with a selected set thereof.

3. A cryptographic system as defined in claim 2, including means operative at random to reset the ring counter means of said encoder apparatus to a selected initial count condition and concurrently generate a selected transmission signal, and said decoder means having means responsive to said transmission signal for resetting the ring counter means of said decoding apparatus to said selected initial count condition.

4. A cryptographic system as defined in claim 1, including means operative at random to reset the ring counter means of said encoder apparatus to a selected initial count condition and concurrently generate a selected transmission signal, and said decoder means having means responsive to said transmission signal for resetting the ring counter means of said decoding apparatus to said selected initial count condition.

5. A crytographic system as defined in claim 3, wherein said encoding apparatus includes keyboard means for producing said character-denoting inputs signals, said keyboard means including key operated means denoting a selected character which occurs at random locations in messages to be transmitted for producing a selected signal, and means responsive to said selected signal whenever it occurs to reset said ring counter means and generate said selected transmission signal.

6. A cryptographic system as defined in claim 1, wherein said encoding apparatus includes tone encoder means for producing a plurality of distinctive tone signals respectively denoting the ciphers and transmitting them to remote locations, and said decoding apparatus includes tone decoders for responding to the transmitted tone signals to produce said cipher-denoting input signals.

7. A cryptographic system as defined in claim 5, wherein said encoding apparatus includes tone encoder means for producing a plurality of distinctive tone signals respectively denoting the ciphers and transmitting them to remote locations, and said decoding apparatus includes tone decoders for responding to the transmitted tone signals to produce said cipher-denoting input signals.

8. A cryptographic system as defined in claim 7, wherein said encoding apparatus includes input means comprising said keyboard means and output means comprising said tone encoder means and said decoding apparatus includes input means comprising said tone decoders and output means comprising a printout device, and said encoding and decoding apparatus each having adjustable programmer devices establishing variable connections between the matrix and the input means and between the matrix and the output means thereof for altering the enciphering and deciphering programs thereof.

References Cited

UNITED STATES PATENTS 3,300,596 1/1967 Johnsen ---------- 178—22 X

RODNEY D. BENNETT, Jr., Primary Examiner

D. C. KAUFMAN, Assistant Examiner